June 19, 1951      W. SCHMID      2,557,918
MOLDING AND BROACHING MACHINE
Filed Feb. 19, 1948      2 Sheets-Sheet 1
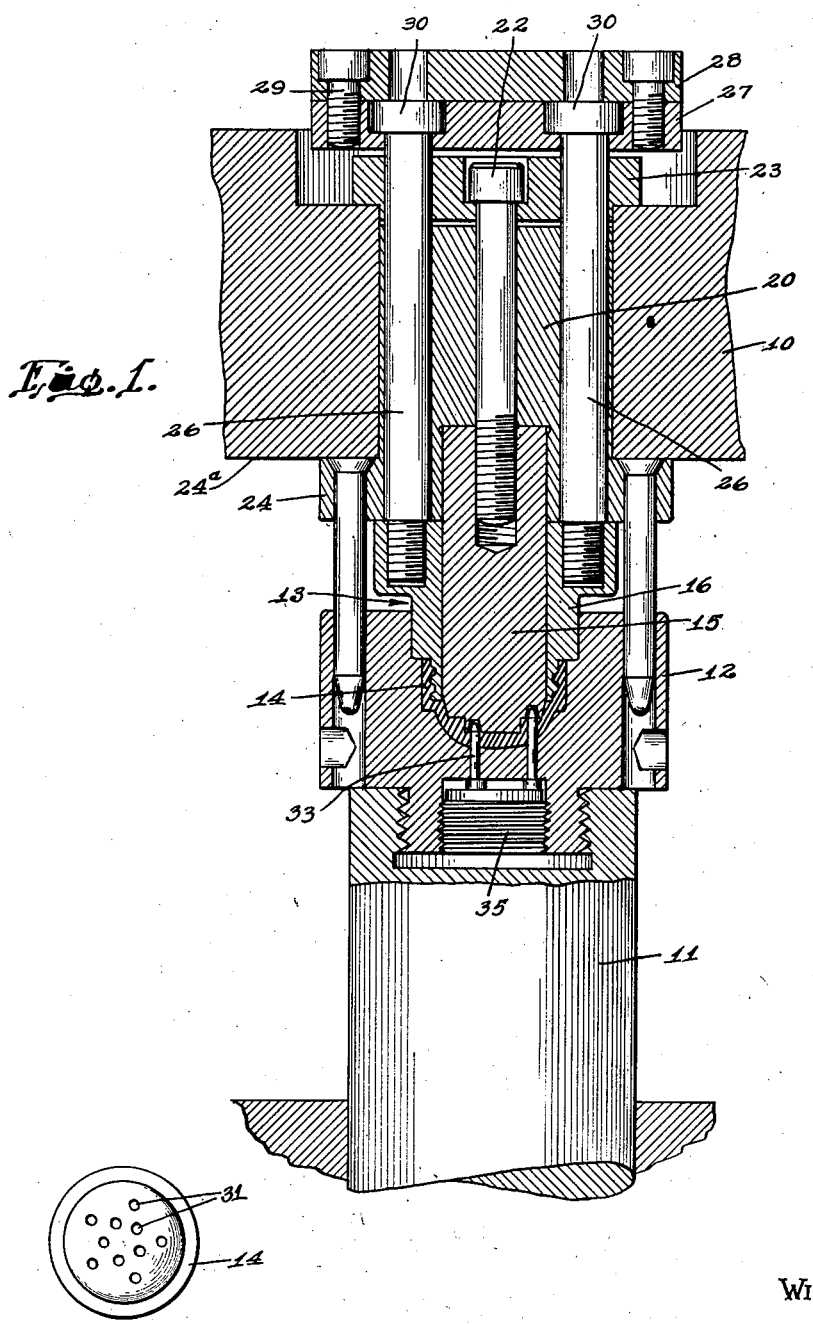
Inventor
WILLIAM SCHMID
By Rule and Hoge,
Attorneys June 19, 1951 W. SCHMID 2,557,918
MOLDING AND BROACHING MACHINE
Filed Feb. 19, 1948 2 Sheets-Sheet 2

Inventor
WILLIAM SCHMID
By Rule and Hoge,
Attorneys

Patented June 19, 1951

2,557,918

UNITED STATES PATENT OFFICE 2,557,918

MOLDING AND BROACHING MACHINE

William Schmid, Toledo, Ohio, assignor to Owens-Illinois Glass Company, a corporation of Ohio Application February 19, 1948, Serial No. 9,467

5 Claims. (Cl. 18—42)

My invention relates to machines for molding articles, including caps for salt and pepper shakers and other articles, the invention comprising means for forming or broaching openings extending through the walls of the molded articles. An object of the invention is to provide a novel and practical means for molding a shaker cap and concurrently forming a multiplicity of openings or perforations extending through the wall of the cap as a part of the complete molding operation.

A further object of the invention is to provide an improved molding machine for molding screw-threaded shaker caps on a screw-threaded die and concurrently with the molding operation, forming, by means of broaching pins, perforations extending through the caps and sealed by hollow projected portions of the molding material, and breaking said projections away in the operation of unscrewing the molded cap from the threaded die.

Other objects of the invention will appear hereinafter.

Referring to the accompanying drawings:

Fig. 1 is a sectional elevation of a molding machine with dies designed for molding shaker caps, parts of the machine being broken away;

Fig. 2 is a plan view of a molded cap;

Figure 3:
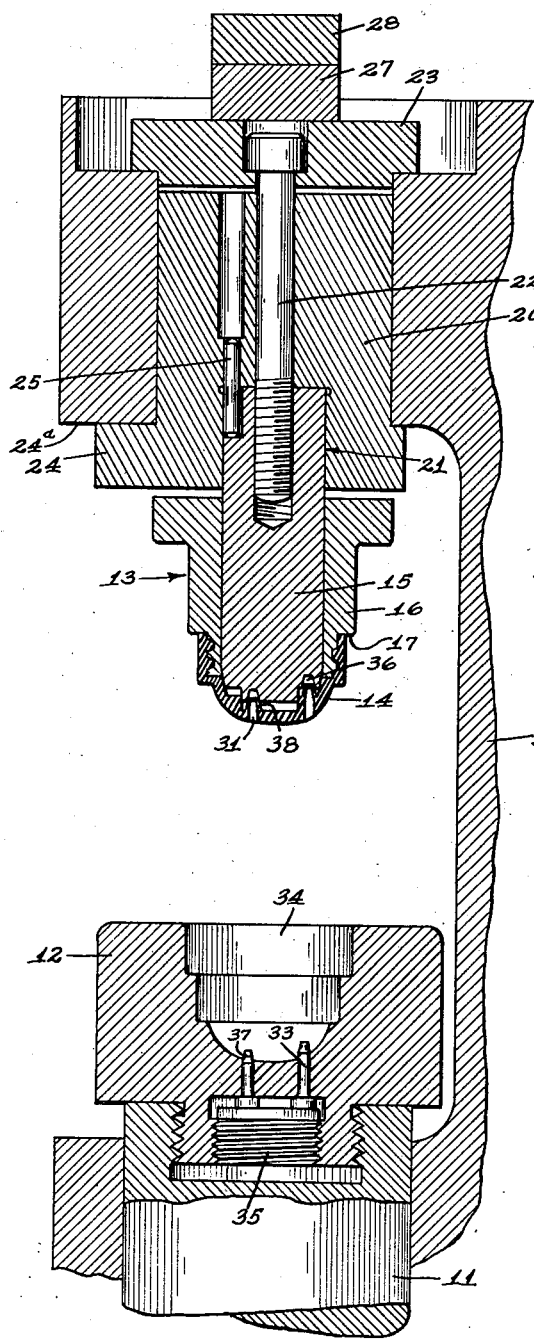
Fig. 3 is a sectional elevation of the parts shown in Fig. 1, the plane of section being at right angles to that of Fig. 1 and the lower die lowered following the molding operation.

The dies as herein illustrated are adapted for molding plastic materials, either of the thermoplastic or thermosetting type, and may form parts of an automatic molding machine such as disclosed, for example, in the patent to Lauterbach, #2,155,316, April 18, 1939, Machine for Molding Plastic Materials.

Referring to Figs. 1 and 2, the machine comprises a frame member or carriage 10 in which is mounted a vertically reciprocating plunger 11 carrying the lower die 12 which cooperates with an upper die 13 for molding articles 14. The upper die 13 includes an inner cylindrical member 15 herein termed a force plug and an outer tubular member or sleeve 16 having a limited up-and-down sliding movement relative to the plug 15, as hereinafter set forth.

The lower end portion of the die member 16 is of reduced diameter, thereby providing a shoulder 17 which forms the top wall surface of the molding cavity. The said reduced end portion of the die is formed with a spiral or screw thread 18 by which a spiral thread is molded in the interior surface of the cap 14.

The frame member 10 is formed with a cylindrical opening extending therethrough in which is mounted a cylindrical block 20 which carries the force plug 15, the latter being fitted in a bore 21 in the block 20. The plug 15 is clamped in position by a screw bolt 22 extending downwardly through a head plate or disk 23 and threaded into the plug. The plate 23 seats on the frame member 10 and the block 20 is formed with a flange 24 underlying a surface 24$^a$ of the frame 10, permitting the block to be clamped in position. Rotative movement of the force plug 15 within the block 20 is prevented by a pin 25.

The molding sleeve 16, which has limited up-and-down movement relative to the force plug 15, as before noted, is carried by a frame or assembly comprising a pair of vertical rods 26 located on opposite sides of the force plug and extending through vertical bores in the block 20, and a yoke consisting of a pair of cross bars 27 and 28 clamped together by screw bolts 29. The rods 26 are formed with heads 30 clamped between the bars 27, 28. When the lower die 12 is in its lowered position, as shown in Fig. 3, the die sleeve 16 is also in its lower position relative to the plug 15, with the cross bar 27 resting on the disk 23.

The means for forming openings 31 in the molded caps 14 comprise a plurality of headed broaching pins 33 which extend upwardly through openings in the die 12 and project into the mold cavity 34 formed in the die. The pins 33 are held in place by a plug 35 screw-threaded into a recess in the bottom of the die 12. The pins 33 are relatively positioned and arranged as indicated by the openings 31 (Fig. 2) in the cap.

Figure 4:
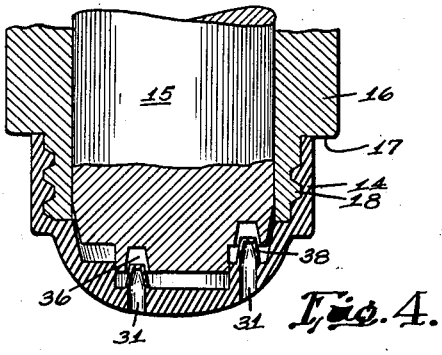
Fig. 4 is a sectional view on a comparatively large scale of the upper die, showing a molded cap thereon.
Figure 6:
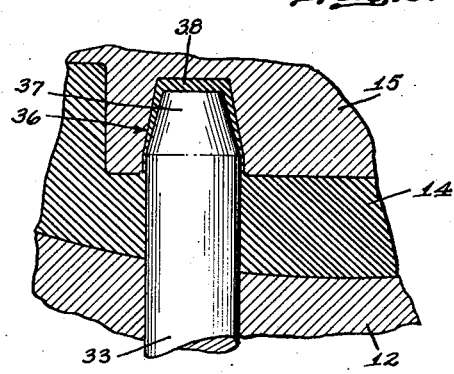
Fig. 6 is a fragmentary view on a still larger scale showing one of the broaching pins for forming an opening through the molded cap.

Referring to Figs. 4 and 6, the force plug 15 is formed in its bottom face with upwardly extending recesses 36 or wells which register with and receive the upper ends of the pins 33 when the mold sections are brought together. The wells 36 are frusto-conical in shape, having their side walls tapered upwardly. Each pin 33 has its upper end portion 37 tapered, preferably at a somewhat greater angle to the vertical than the walls of the wells 36. The pins 33 are of slightly smaller diameter at the base of the wells 36 than the diameters of said wells. The pins 33 are also of such length that when the dies are brought to closed position (Fig. 1) the upper ends of the pins are spaced from the opposite surfaces of the plug 15. The construction is such that when the mold sections are brought together for molding a cap, a portion of the molding material is forced upwardly by each pin 33 into the cooperating well 36 and thereby molds a thin hollow shell or projection 38 within the well 36, said projection being integral with the molded cap 14.

Figure 5:
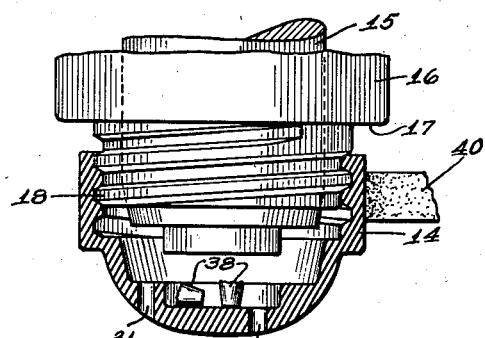
Fig. 5 is a similar view showing the molded cap partially unscrewed from the die.

The operation of the machine is as follows:

While the dies are separated, as shown in Fig. 3, and the sleeve 16 of the upper die is in its lowered position relative to the force plug 15, a charge of molding material is placed in the mold cavity 34 and the lower die member 12 is then moved upwardly. The upper die is thus caused to enter the mold cavity and mold the cap 14. During the final upward movement of the lower die, the upward pressure of the molding material on the sleeve member 16 forces it upwardly while the plug 15 remains in fixed position, said upward movement of the sleeve 16 being arrested when the sleeve abuts the block 29 (Fig. 1). During this molding operation, the pins 31 are forced through the wall of the molded article 14 into the wells 36, thereby molding the hollow projections or caps 38 on the article 14. After this molding operation, the lower die 12 is lowered away from the molded article. During the initial downward movement of the lower die, the sleeve member 16 moves downward by gravity a short distance until the cross bar 27 seats on the disk 23 as shown in Fig. 3. The projections 38 are thus lowered a short distance, freeing them from the walls of the wells 36, but leaving them projecting a short distance into said wells as shown in Fig. 4. The molded article is next unscrewed from the threaded sleeve 16. This may be done by any suitable unthreading device as, for example, a rotating disk 40 (Fig. 5) of rubber or the like in frictional contact with the molded cap and rotated, for example, in the manner disclosed in the above identified Lauterbach patent. During the initial rotation of the molded article, the caps 38, as they project into the wells 36, are broken off as indicated in Fig. 5, thereby completing the openings 31 through the molded cap 14.

Modifications may be resorted to within the spirit and scope of my invention.

I claim:

1. Apparatus for molding an article with a screw thread thereon and concurrently forming an opening through the wall of the article, said apparatus comprising a molding element including a core and an outer molding sleeve surrounding the core and having a screw thread thereon for forming the screw thread on said article, a complemental molding element, a broaching pin mounted in said complemental element, said molding elements being mounted for relative movement to and from a molding position with a mold cavity therebetween in which the article is molded with said pin projecting through the mold cavity and molded article into a recess formed in the said core in register with said pin, the said recess forming with the pin a cavity in which a cap is molded over the opening in the molded article through which the pin projects, said sleeve with the molded article thereon being mounted for a limited straight-line movement relative to the core in a direction lengthwise of the core and by which movement the said molded cap is partially withdrawn from the recess in said core, means for rotating the molded article when the said cap is in said partially withdrawn position and thereby unscrewing the molded article from the molding sleeve and concurrently breaking said cap away from the molded article to complete the opening therethrough, and means for preventing relative rotation of the molding sleeve and core during the unscrewing of the molded article.

2. Molding apparatus for molding a screw threaded cap and forming openings through the wall of the cap, said apparatus comprising a die having a mold cavity therein, a second die comprising a plug and a sleeve member surrounding the plug and formed on its outer surface with a screw thread, said dies being mounted for relative movement to and from a closed position in which they form a closed mold cavity in which the said cap is molded, broaching pins connected to said first mentioned die and projecting through the closed mold cavity and forming openings through the molded cap, said plug having wells formed therein in register with said pins and into which the free ends of the pins protrude when the dies are in said closed position, said wells being of slightly larger diameter than the pins and forming therewith mold cavities in which cover caps are molded over the openings formed by said pins, said sleeve member being free for a limited movement relative to the plug in a direction to partially withdraw the said cover caps from the plug when the dies are separated and the screw-threaded cap is in position on the sleeve member, means for locking the plug against rotative movement relative to the sleeve member during said partial withdrawal of the cover caps, and means for rotating the screw-threaded molded article relatively to the sleeve member and plug after said partial withdrawal of the cover caps and thereby unscrewing the article from said sleeve member and by said rotation, breaking the said cover caps away and completing the openings through the molded article.

3. Molding apparatus for molding a screw threaded cap and forming openings through the wall of the cap, said apparatus comprising a die having a mold cavity therein, a second die comprising a plug and a sleeve member surrounding the plug and formed on its outer surface with a screw thread, said dies being mounted for relative movement to and from a closed position in which they form a closed mold cavity in which the said cap is molded, broaching pins connected to said first mentioned die and projecting through the closed mold cavity and forming openings through the molded cap, said plug having wells formed therein in register with said pins and into which the free ends of the pins protrude when the dies are in said closed position, said wells being of slightly larger diameter than the pins and forming therewith mold cavities in which cover caps are molded over the openings formed by said pins, said sleeve member being movable relatively to the plug when the dies are separated, said movement of the sleeve being in a direction and a sufficient distance to partially withdraw the said cover caps from the wells in said plug, means for locking the plug against rotative movement relative to the sleeve member, and means for rotating the molded article after said relative movement of the sleeve member and plug and thereby unscrewing it from the threaded sleeve member and simultaneously breaking the said cover caps away to complete the openings through said molded article.

4. Apparatus for molding a cap, comprising a die having a mold cavity, a second die comprising a core and a molding sleeve surrounding the core and formed with a screw thread on its exterior lateral surface, said sleeve being mounted for limited movement lengthwise of the core, means for preventing relative rotation of the sleeve and core said dies being mounted for relative movement to and from a closed position in which they provide a closed mold cavity in which the cap is molded, the said sleeve being free for said relative movement after an article has been molded and the dies separated, thereby withdrawing the said core a short distance from its molding position within the molded article, and means for then rotating the molded article about the axis of said sleeve and thereby unthreading it from the sleeve, a pin carried by one of the dies, the other die being formed with a well into which the pin projects when the dies are in closed position, said pin and well being positioned eccentric to the said axis and with the pin extending through the molded article while the molds are in closed position.

5. Molding apparatus for molding an internally screw-threaded cap having a multiplicity of openings extending through the wall of the cap, said apparatus comprising a lower die having a mold cavity therein, an upper die comprising a core and a sleeve surrounding the core, the sleeve being mounted for limited up and down movement relative to the core and being formed with an external screw thread, means for preventing rotation of the sleeve, said upper die being mounted above and in register with the lower die, the lower die being movable up and down to and from a closed position in which the dies form a closed mold cavity, broaching pins connected to the lower die and projected upwardly through the mold cavity and the molded cap therein when the dies are in closed position, with the upper ends of the pins protruding into wells formed in the said core, the wells being of slightly larger diameter than the pins and forming therewith mold cavities in which cover caps or shells are molded over the openings formed by said pins, the lower die being movable downward to open the mold and leave a molded cap attached to the screw-threaded sleeve, said sleeve being movable downward relative to said core, when the lower die is lowered, the downward movement of the sleeve being sufficient to partially withdraw the pins from said wells, and means for then rotating the molded cap and thereby unscrewing it from the sleeve and simultaneously breaking the said shells away to complete the openings through the molded cap.

WILLIAM SCHMID.

REFERENCES CITED

The following references are of record in the file of this patent:

UNITED STATES PATENTS

| Number | Name | Date |
|---|---|---|
| 2,087,470 | Davidson et al. | July 20, 1937 |
| 2,155,316 | Lauterbach | Apr. 18, 1939 |
| 2,277,599 | McGinnis | Mar. 24, 1942 |
| 2,304,141 | Bergmann | Dec. 8, 1942 |
| 2,404,631 | Gronemeyer | July 23, 1946 |
| 2,421,928 | Davis | June 10, 1947 |
| 2,445,742 | Hoch | July 20, 1948 |